United States Patent [19]

Kron

[11] 4,321,044
[45] Mar. 23, 1982

[54] ADVANCED G CUEING SYSTEM

[75] Inventor: Gerald J. Kron, Binghamton, N.Y.

[73] Assignee: The Singer Company, Binghampton, N.Y.

[21] Appl. No.: 960,525

[22] Filed: Nov. 14, 1978

[51] Int. Cl.³ .................... G09B 9/08; A47C 1/00
[52] U.S. Cl. ............................ 434/59; 297/284; 297/312; 297/DIG. 8
[58] Field of Search ............... 35/12 E, 12 H, 12 R, 35/12 C, 12 D, 128; 297/284, 312, DIG. 8; 434/59

[56] References Cited

U.S. PATENT DOCUMENTS

| | | | |
|---|---|---|---|
| 3,270,440 | 9/1966 | Radosevic | 35/12 E |
| 3,309,795 | 3/1967 | Helmore | 35/12 E |
| 3,352,029 | 11/1967 | Callanen | 35/12 P |
| 3,983,640 | 10/1976 | Cardullo et al. | 35/12 E |
| 4,030,207 | 6/1977 | Kron | 35/12 E |
| 4,030,208 | 6/1977 | Carver et al. | 35/12 E |
| 4,059,909 | 11/1977 | Kron | 35/12 E |
| 4,164,079 | 8/1979 | Ashworth | 35/12 E |

FOREIGN PATENT DOCUMENTS

| | | | |
|---|---|---|---|
| 1539717 | 10/1968 | France | 297/284 |
| 2278295 | 2/1976 | France | 297/204 |
| 979495 | 1/1965 | United Kingdom | 35/12 E |

*Primary Examiner*—William H. Grieb
*Attorney, Agent, or Firm*—Stephen F. Kaufman; Jeff Rothenberg

[57] ABSTRACT

An improved G-seat system for providing kinesthetic cues to the operator of a vehicle simulator in which the motion sensations associated with the "G" forces are simulated by the motion of a single seat plate (62) having a pair of passive thigh ramps (78) mounted thereon and the variation in the degree of inflation of thin bladders (82A,B) which overlie the seat plate. Raised surfaces (80) may be provided on the plate beneath the ischial tuberosity region of the operator to increase the dynamic range of perceived g-loading effects. A backrest plate (92) may be provided for motion in conjunction with the seat plate and a thin bladder (128) may likewise be provided theron. Driven radial elements (108,110) may then be positioned on the lower part of the backrest plate to augment pressure cues at selected areas of the operator's back.

22 Claims, 8 Drawing Figures

SIDE VIEW OF SEAT PAN AND BACKREST

TOP VIEW OF BACKREST AND REAR VIEW OF SEAT PAN

FIG. 8

ADVANCED G CUEING SYSTEM

DESCRIPTION

The Government has rights in this invention pursuant to Contract No. F33615-76-C-0060 awarded by the Department of the Air Force.

TECHNICAL FIELD

The present invention relates to the field of simulation devices, and more particularly relates to an improved G-seat system.

BACKGROUND ART

During maneuvering, significant somatic perceptions are available to pilots of tactical aircraft and are induced by the inertial acceleration reaction on the pilot's body and the coupling existing between the body and the actual aircraft seat. Such maneuvering often carries the aircraft close to the bounds of its flight envelope and exposes the pilot to a broad range of vibratory information concerning aircraft dynamic state as well as configuration. It is well known that pilots employ these perceptions in the handling of their aircraft. Consequently, in the art of aircraft simulators an effort has been made to develop devices which provide a rendition of these cues in the simulation of tactical aircraft.

The first major development in the art was the motion system. Motion systems, however, are limited in their ability to provide sustained acceleration information due to the excursion and velocity constraints intrinsic to the system. For high performance tactical aircraft simulators this limitation is particularly apparent. For such simulators, motion systems provide only the leading edge of the simulated acceleration. This is followed by a fading of the perception during the subliminal "washout" phase, during which the motion system restores itself to regain the capability expended in delivering the onset cue.

To supplement the information provided by motion systems and provide sustained acceleration cues, the "G-seat" was developed. The G-seat directly addresses the haptic-somatic sensory system, which consists of the muscle, joint, and flesh pressure receptors employed in perceiving physiological changes due to sustained acceleration.

Early G-seats were crude, employing such expedients as harnesses to move the pilot about in his seat, air cushions and the like. These early devices typically suffered from such serious shortcomings as seat cushion balooning, generation of false and conflicting cues, and deterioration of cockpit realism due to cumbersome extraneous hardware.

To overcome the problems associated with these prior art devices the present inventor, in conjunction with two co-workers previously devised a revolutionary new seat for simulating aircraft motion, described in U.S. Pat. No. 3,983,640, which issued Oct. 5, 1976. This invention, denominated an Advanced G Seat, provides compatible body excursion, flesh pressure gradient and area of contact cues associated with various acceleration profiles, while maintaining cockpit fidelity. At the heart of the invention are two mosaics of air cells having individual rigid top plates which define a seat pan surface and backrest surface. By individually driving each cell, the composite elevation, attitude and shape of these surfaces can be varied to provide the desired motion cues. A plurality of dynamic clam-shell shaped air cells are located on either side of the seat pan, to provide thigh pressure and area of contact cues. Also provided is a driven lap belt to supply ventral area pressure variation.

The versatility provided by the Advanced G Seat mosaic surface allows controlled variations in seat pan heave or sink, pitch, roll, contouring and, by way of the active clam-shell aircells, area of flesh contact. Also provided are backrest cushion translation, attitude reorientation (tip and tilt) and contouring. The surface shape, or contour variations provide the pilot with localized pressure change sensations on his body, corresponding, e.g., to his being pushed into the seat during high acceleration.

Three other G-seat related patents have issued since the Advanced G Seat, covering an auxiliary skin tension cueing system for use in conjunction with a G-seat (U.S. Pat. No. 4,030,207), a separate seat vibrator for the simulation of aircraft buffeting (U.S. Pat. No. 4,030,208) and another G-seat configuration (U.S. Pat. No. 4,059,909). The last patent, which issued to the instant inventor, employs a mosaic of separately driven air cells which make up the seat pan and backrest and which, as in the Advanced G Seat, provide a variable seat surface. Seat firmness cues are provided by a plurality of inflatable firmness cells which overlie the mosaic of aircells. These firmness cells provide firmness cues either by being inflated or, when used in conjunction with rigid plates located beneath them, by being deflated to lower the body onto the hard surface.

Each of the above g seats inventions is an extremely significant milestone in terms of mid-range g-level cueing, particularly the Advanced G Seat which has been employed in a number of tactical aircraft simulators with considerable success.

However the performance of g-seats employing the above inventions has been less than totally satisfactory. Because of the mosaic construction and separate motion of each element, the potential exists, under minimum maintenance conditions for nonsynchronous cell movement. Further, the range of localized pressure sensation available is fairly small, thus limiting the dynamic range of simulated g-loading. The result is an attenuated, possibly distorted perception of the g loading desired to be simulated.

Another limitation of the above prior art g-seats is that they have low element response bandwidths, typically of the order of 1 hertz or so. Because of this low bandwidth, it is impossible for these pneumatic g-seats to pass high frequency acceleration cues such as aircraft buffet without employing a separate "shaker" type device such as that disclosed in U.S. Pat. No. 4,030,207 mentioned above. Furthermore, in the absence of a platform motion system whose principal purpose is to track and reproduce the leading edge of an acceleration profile, it is almost impossible to use low bandwidth pneumatic g-seats to present faithful onset cues on a tactical aircraft simulator.

The seat system of the present invention provides highly improved subjective "feel" of the g-loading effects being simulated. Very strong localized pressure sensations are provided, greatly expanding the dynamic range of perceived g loading, while at the same time the seat feels like an integrated structure. Fewer driven elements are employed while band pass is increased to 10 hertz or more thus providing onset cueing capability. Further, buffeting cues can be provided directly by way of the seat system thus eliminating the need for a separate shaker system. These improvements are accomplished while at the same time retaining the compatible cue generation capability and cockpit fidelity which characterized the first generation g-seats.

DISCLOSURE OF INVENTION

According to the present invention a seat for simulating accelerations is provided having a single hard seat pan surface with typically 4 degrees of drive capability including pitch, roll, heave and longitudinal. A pair of raised surfaces are provided on the top of the seat pan surface, along the area of outer thigh contact. At least two inflatable firmness cells are provided on top of the seat pan surface, one on either side of the seat pan surface, to provide deep flesh pressure cues corresponding to the increased seat hardness experienced by the pilot undergoing increased g-load, and also to provide, in conjunction with the raised surfaces, area of contact tactile cues. Raised surfaces may also be provided under the ischial tuberosity region to enhance the dynamic range of seat flesh pressure cues.

A hard backrest surface may also be provided having at least 3 degrees of drive capability including pitch, roll and surge. A pair of movable surface elements may be provided on either side of the lower part of the backrest for lower back pressure cue enhancement, and a single firmness cell may be provided on the backrest surface.

Preferred driving means are a plurality of hydraulic actuators which, particularly when used with position feedback, permit sufficiently expanded bandwidth to provide onset acceleration cues. And finally, a lap belt with differential drive may also be provided to effect pressure and scrubbing cues to the ventral area of the subject.

BRIEF DESCRIPTION OF DRAWINGS

These and other features of the present invention will be more clearly understood from a consideration of the following description taken in connection with the accompanying drawings in which:

FIG. 6 is a block diagram of the control system for a hydraulic actuator employed in the preferred embodiment of the present invention; while

BEST MODE FOR CARRYING OUT THE INVENTION

Figure 1:
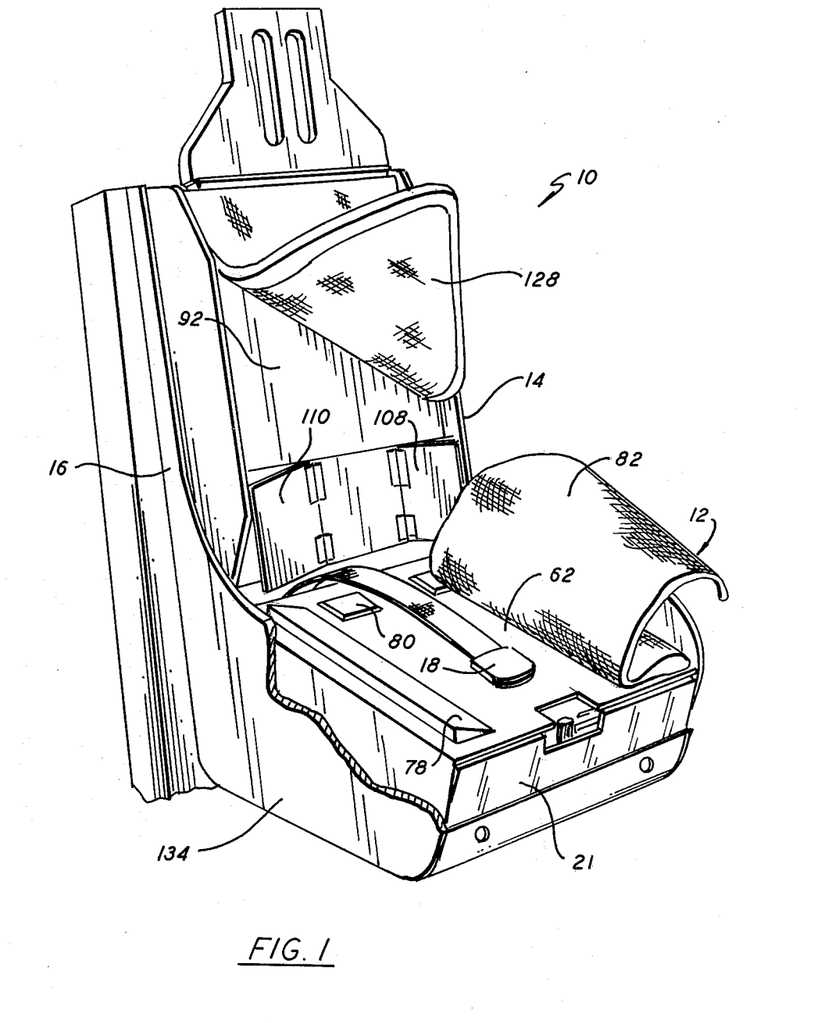
FIG. 1 is an orthogonal view of the preferred embodiment of the advanced G seat of the present invention.

The preferred embodiment of the g-seat system 10 of the present invention is shown in FIG. 1. It is comprised of two basic elements—a seat pan assembly 12 and a backrest assembly 14. These are mounted on a flame 16 which may, in turn, be mounted, e.g., in an aircraft simulator. Seatbelt 18 can also be seen in FIG. 1.

FIG. 1 shows a g-seat system with firmness cells 82, 128 folded back to reveal moving plates 62, 92. In operation, several actuator assemblies vary the position and attitude of these plates to produce body excursions appropriate to the motion being simulated, in a manner that will be more fully described hereinafter. Seat pan 21, shown in FIG. 1, houses seat pan assembly 12. Also shown in FIG. 1 are radial elements 108, 110, firmness cells 82, 128, thigh ramps 78 and tuberosity blocks 80, all of which will be explained more fully hereinafter.

Figure 2:
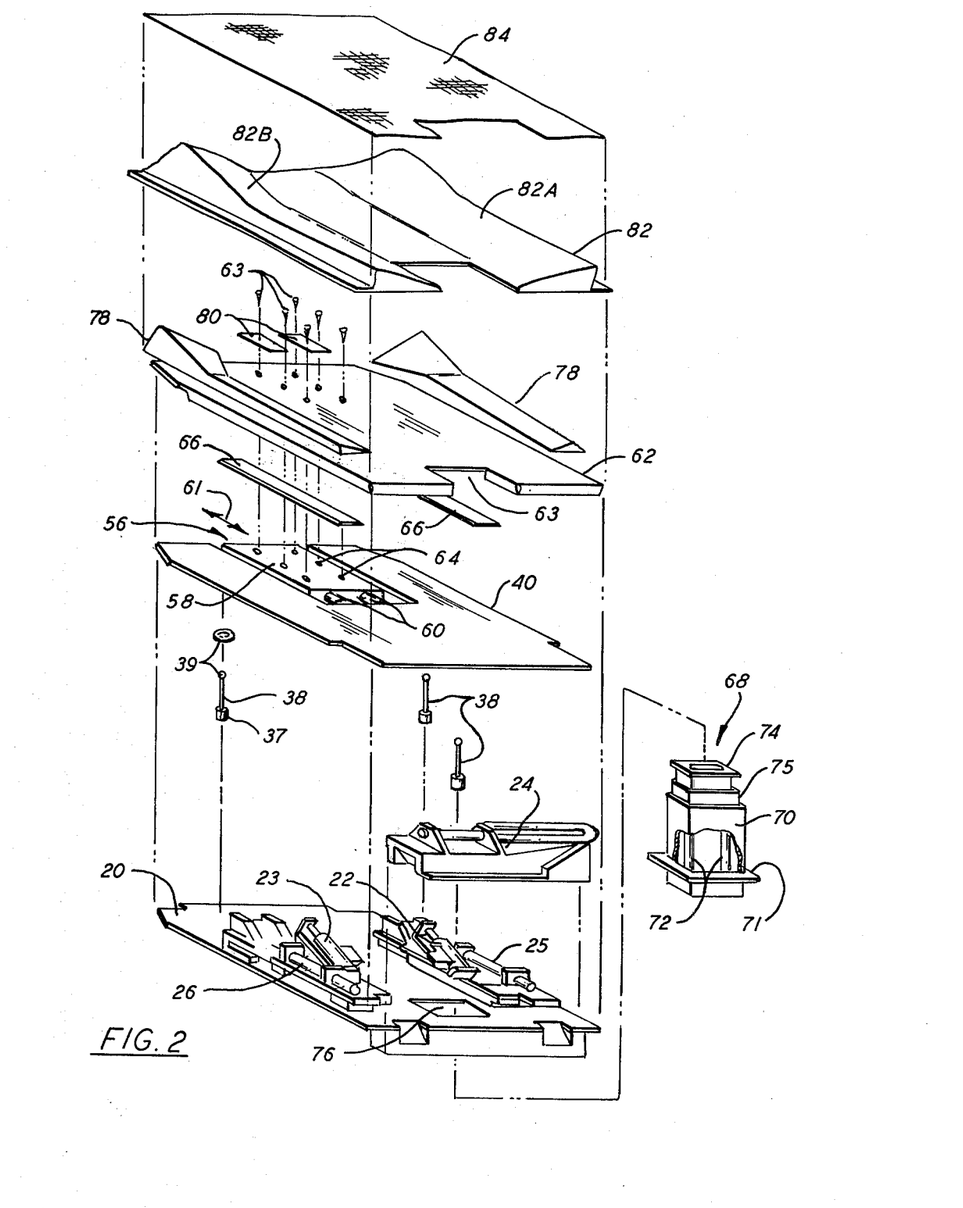
FIG. 2 is an exploded view of the seat pan assembly of the preferred embodiment of the present invention.

Seat pan assembly 12 is shown in exploded view in FIG. 2. As shown, assembly base plate 20 supports three hydraulic actuator sub-assemblies: left and right side actuator assemblies 22, 23, and forward actuator assembly 24. These actuator assemblies all connect to longitudinal actuator assembly plate 40 by way of push rods 38. The actuator assemblies drive the seat pan plate in a vertical direction and thus provide the plate with vertical (heave) motion as well as pitch and roll. Also incorporated with side actuator assemblies 22, 23 are separate seatbelt actuator assemblies 25 and 26 which will be described more fully hereinafter.

To insure horizontal translational stability for plate 40, a seat stabilizer assembly 68 is connected to it. This assembly, shown in partial cut-away in FIG. 2, is housed in housing 70 and is mounted by way of bracket 71 to base plate 20 through cut-out 76. The top of the assembly is a brace 74. This brace is connected by way of a trunnion arrangement to a sleeve 75 which permits brace 74 to pitch and roll only with respect to sleeve 75. Sleeve 75 is free only to slide up and down a pair of vertical shafts, or rails, 72 which are mounted in housing 70, as shown. As plate 40 pitches, rolls and heaves, brace 74, connected to it, is likewise caused to move with it in the same way. Further, while plate 40 might otherwise tend to wobble laterally because of the required three degree of freedom capability designed into push rods 38 and their associated sockets, as will be more fully described hereinafter, the stabilizer assembly 68 prevents this.

Longitudinal movement capability for the seat pan plate 62 is provided by way of a longitudinal actuator assembly 56 housed in a cut out of plate 40. This assembly, shown in FIG. 2, comprises actuator housing 58 and an actuator/LVDT subassembly therein (not shown) connected to plate 40 by way of bearing shafts 60. Housing 58 is free to move along bearing shafts 60 in the longitudinal direction shown by arrow 61. Upper plate 62 is attached to housing 58, for example by way of screws 63 which pass through to threaded holes 64 in the housing 58, as shown in FIG. 2. Plate 62 rests on wear strips 66 which are mounted on plate 40. Longitudinal drive capability for the upper plate 62 is cascaded by way of longitudinal actuator assembly 56 onto the pitch, roll and heave capabilities provided by actuators 22, 23, 24.

A unique firmness cell 82 is mounted on top of upper plate 62, contoured to fit over thigh ramps 78 and tuberosity blocks 80. This thin, pneumatic pancake cell is designed to be normally inflated at just enough pressure to bearly hold the buttocks of the seated subject off of the plate 62. By deflating cell 82 the buttocks may be completely lowered onto the plate, or, by partially deflating the cell, partially lowered onto the plate. Cell 82 has two parts, a left 82A and a right 82B to permit selective lowering of each buttock of the subject.

Lowering the buttocks onto the hard plate 62 in above-described manner has the effect of creating in the subject the sensation of increased body pressure on the seat, similar to that which the subject would feel were he experiencing the g-loading effects produced, for example, by the upward acceleration of the aircraft being simulated. By lowering only one buttock, the effects of the lateral translational acceleration, or of aircraft roll can be simulated.

Area of flesh contact cues are provided by way of a pair of passive thigh ramps 78, mounted on top of and on either side of upper plate 62. These ramps roughly contour to the outside of the thighs. As firmness cell 82 is deflated and the pilot is lowered onto the seat, more of his body contacts these ramps simulating the effect of being "pressed" into the seat by actual g-loading effects.

Also mounted on plate 62 are a pair of low, passive blocks 80 placed at the rear of the plate, directly beneath the ischial tuberosities, the primary skeletal protrusions of the buttocks of the seated subject. These blocks provide an increased dynamic range of perceived seat pressure by stimulating the deep flesh pressure receptors in this region as the subject is permitted to sink onto the seat plate 62 when the firmness cell is deflated.

Cut-out 63 in the front of plate 62 duplicates the cut out of an actual tactical aircraft seat and allows room for the control stick. Fabric cover 84 covers the seat pan assembly 12 and provides complete environmental fidelity for the pilot. A complete description of the principles of operation of the seat pan is given below.

Figure 3:
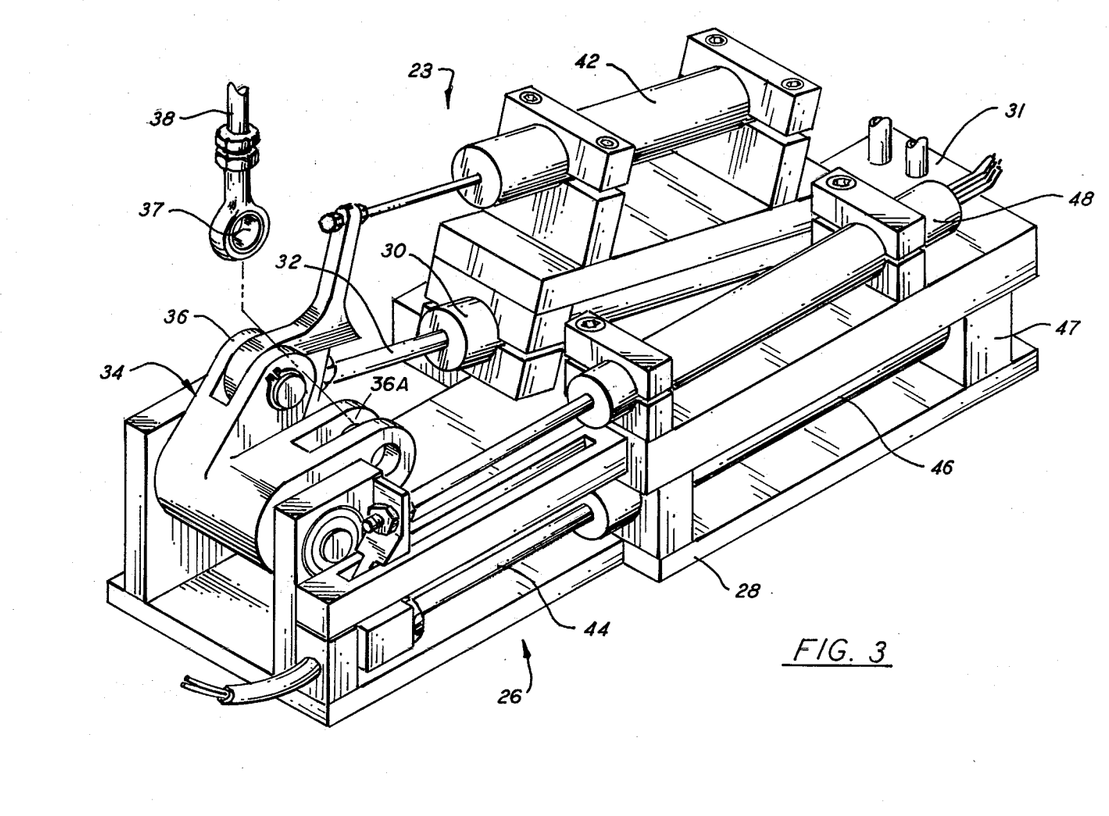
FIG. 3 is an orthogonal view of a seat pan actuator and seat belt actuator subassembly employed in the preferred embodiment of the present invention.

FIG. 3 shows a detailed view of actuator subassembly 23. As can be seen, actuator chassis 28 supports a hydraulic actuator 30 which is pivotably mounted thereto. Near the base of actuator 30 a servo valve 31 is mounted. Valve 31 drives actuator 30 in a manner well known in the art. Piston 32 of actuator 30 is connected to bell crank assembly 34 which translates the relatively horizontal force of the output from actuator 30 to a moment on bell crank arm 36 and causes offset arm 36A to rotate. Offset arm 36A is connected by way of a ball-type bushing 37 to push rod 38 which in turn is connected by way of a ball joint to longitudinal actuator assembly plate 40, as can best be seen in FIG. 2. Thus, activation of actuator 30 drives push rod 38 in the vertical direction. All 3 actuators 22, 23, 24, acting in concert provide pitch, roll and heave capabilities to seat pan plate 62.

Piston 32 is also connected to a linear variable differential transformer ("LVDT") 42, e.g., model SS-207, commercially available from Collins, Inc. LVDT 42 provides an electrical signal corresponding to the position of piston 32 to permit closed-loop operation of actuator 23.

Associated with actuator sub-assembly 23 is a seat belt actuator sub-assembly 26. One end of seat belt 18 is driven by piston 44 of actuator 46 which likewise is driven by a servo valve 47 and is connected to an LVDT 48 for closed loop operation. A similar seat belt actuator sub-assembly 25 is provided in conjunction with actuator sub-assembly 22 for the drive of the other end of seat belt 18.

All actuator sub-assemblies used in seat system 10 employ a similar servo valve/actuator/LVDT/bell crank arrangement to provide highly compact yet strong and accurate drive sources for seat pan assembly 12 and backrest assembly 14. This permits seat 10 to be constructed with a high degree of visual fidelity, as all moving components are compactly arranged in a seat pan and backrest assembly no larger than that of the seat of the aircraft sought to be simulated.

Figure 4:
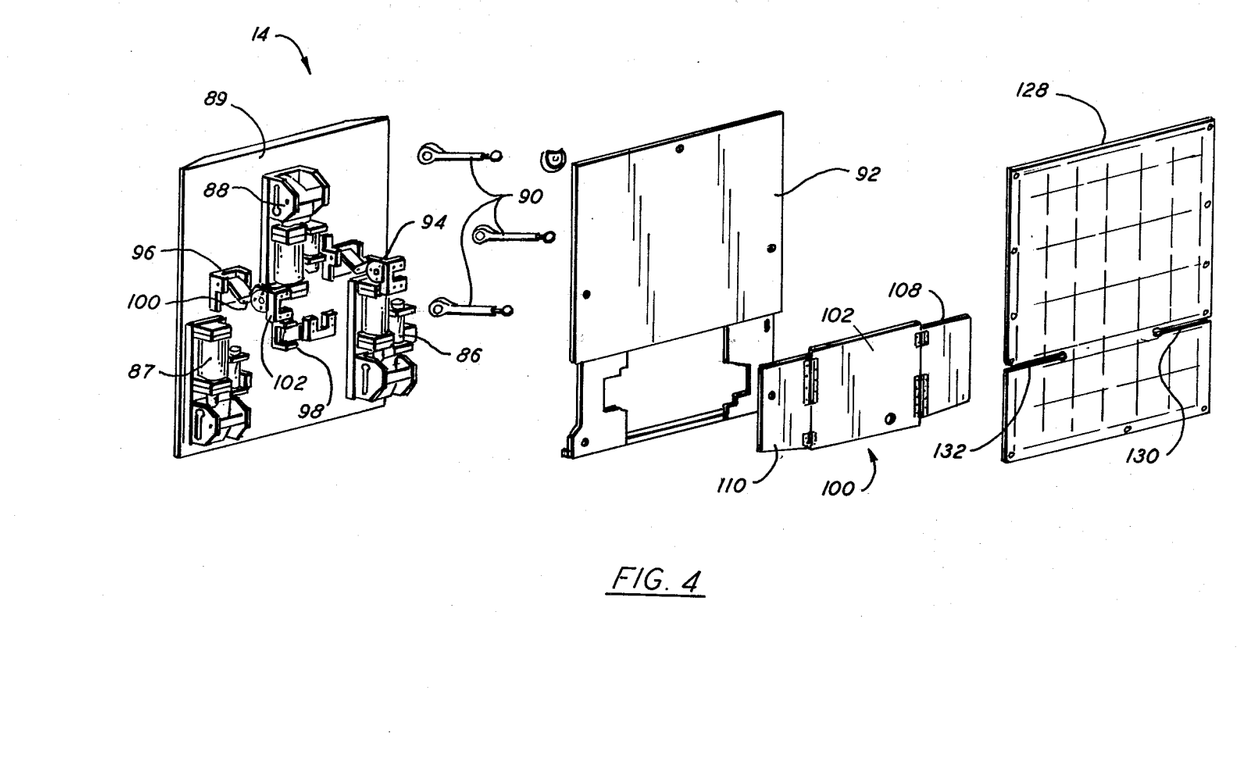
FIG. 4 is an exploded view of the backrest assembly of the preferred embodiment of the present invention.

FIG. 4 shows an exploded view of backrest assembly 14. Three actuator assemblies: a left 86, a right 87, and a top sub-assembly 88, are mounted on rear plate 89, as shown. Push rods 90 connect actuator sub-assemblies 86, 87, 88 to movable backrest plate 92 in a manner identical to push rods 38 in seat pan assembly 12. Stabilization is effected, however, by three "sandwiched hinge" stabilizer subassemblies 94, 96, 98 shown in FIG. 4. Left and right stabilizer sub-assemblies 94, 96 are positioned so that their respective hinge pin axes are at right angles to that of bottom stabilizer subassembly 98. Each "hinge" 100 is connected to a stabilizer brace element 102 by way of a ball and socket joint (not shown). The three stabilizer elements acting in concert thus prohibit lateral and vertical motion in the backrest plate 92 while permitting pitch, roll and surge motion in accordance with the movement of actuator sub-assemblies 86, 87, 88.

Movable backrest plate 92 supports a lower backrest radial assembly 100, as shown. Radial elements 108, 110 are pivotably connected to plate 102, and when driven provide lower back area of flesh contact cues, as will be more fully described hereinafter.

A pneumatic firmness cell 128, which operates on the same principles as firmness cell 82 described above, is placed on plate 92 to complete backrest assembly 14. Slots 130, 132 are provided, as shown, to permit the motion of radial elements 108, 110. A fabric cover (not shown) covers the assembly and, as in the seat pin assembly 12, provides environmental fidelity for the pilot.

Figure 5:
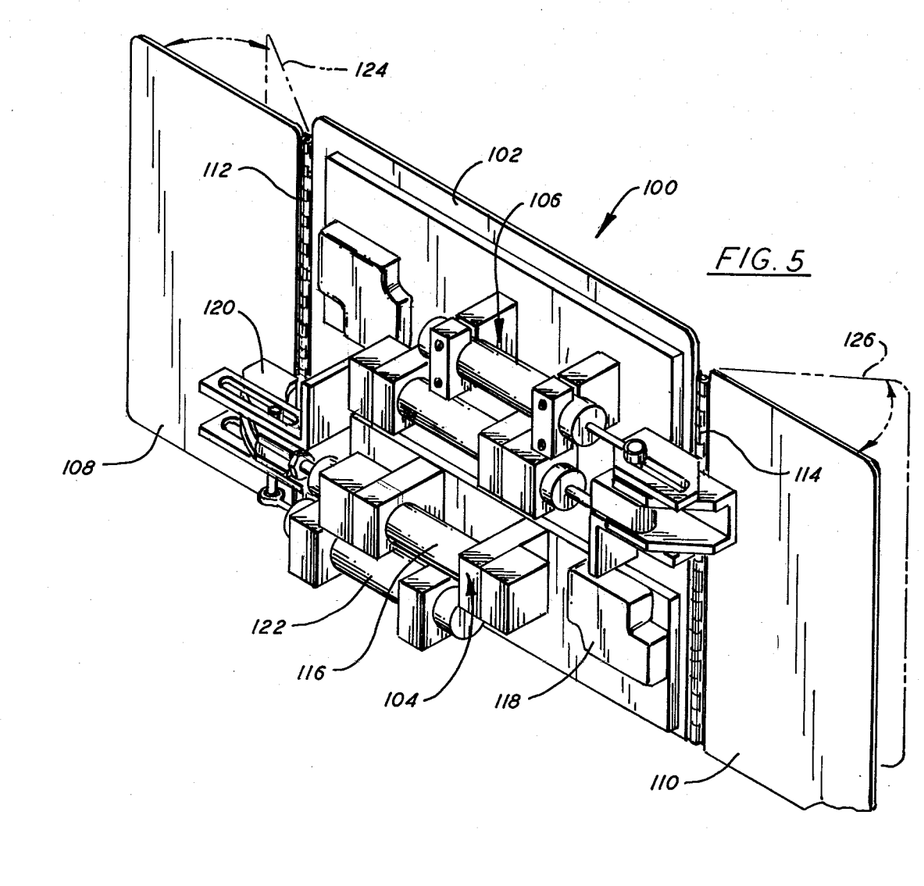
FIG. 5 is an orthogonal view of the backrest radial assembly employed in the preferred embodiment of the present invention.

FIG. 5 shows lower backrest radial assembly 100 in detail. Radial support plate 102 supports left and right radial actuator assemblies 104, 106 which drive left and right radial elements 108, 110, respectively. Radial elements 108, 110 are pivotably connected to plate 102, as by hinges 112, 114. Actuators 104, 106, like the other actuators employed in the present invention, are comprised of a cylinder 116, servo valve 118, bell crank assembly 120 and LVDT 122, as shown. Activation of actuators 104, 106 moves the radial elements in a pivoting fashion, as shown by phantom lines 124, 126.

Support plate 102 attaches to backrest plate 92, as shown in FIG. 4; radial elements 108, 110 are driven to provide lower back area of flesh contact cues.

Figure 6:
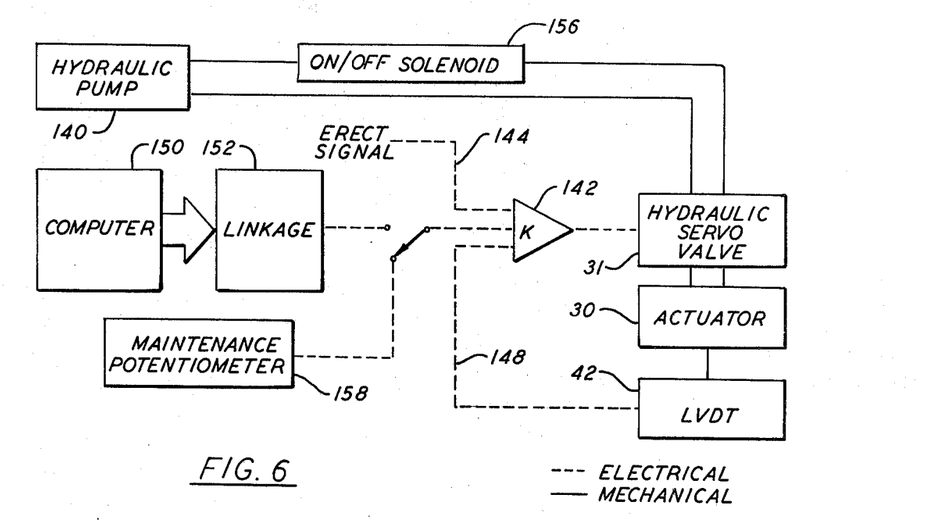

The hydraulic actuator control system used with the g seat of this invention employs a computer-controlled, closed-loop servo operation. FIG. 6 shows a block diagram of the control system for actuator assembly 23. Actuator 30 is driven by servo valve 31 which receives hydraulic fluid under pressure from pump 140 and an electrical control signal from summation amplifier 142. Valve 31 is designed to receive a "zero" signal at steady state. Summing amplifier 142 receives three signals: a pre-applied "erect signal" 144, a command signal 146 and a feedback signal 148. At start-up, erect signal 144 is applied to amplifier 142 to set the actuator 30 to a mid-point position. A computer 150 calculates seat position and attitude information in the course of a simulated "flight" in a manner well known in the art. Computer 150, in turn, drives a linkage 152 which generates a command signal by way of well-known digital-to-analog conversion techniques. This command signal is applied to amplifier 142 which passes the signal to valve 31. The piston rod of actuator 30 moves in response and LVDT 42 follows this motion. As LVDT element moves, a signal 148 opposite in polarity to command signal is generated and applied to amplifier 142. When feedback signal 148 is equal in magnitude to command signal, servo valve 31 shuts off and actuator 30 stops.

On/off solenoid 156 may be provided to tie into a safety shut down system. Maintenance potentiometer 158 may be provided to permit manual actuator control. FIG. 6 shows the system switched to the maintenance mode. All hydraulic actuators used in the present invention are controlled in the manner described above.

Figure 7:
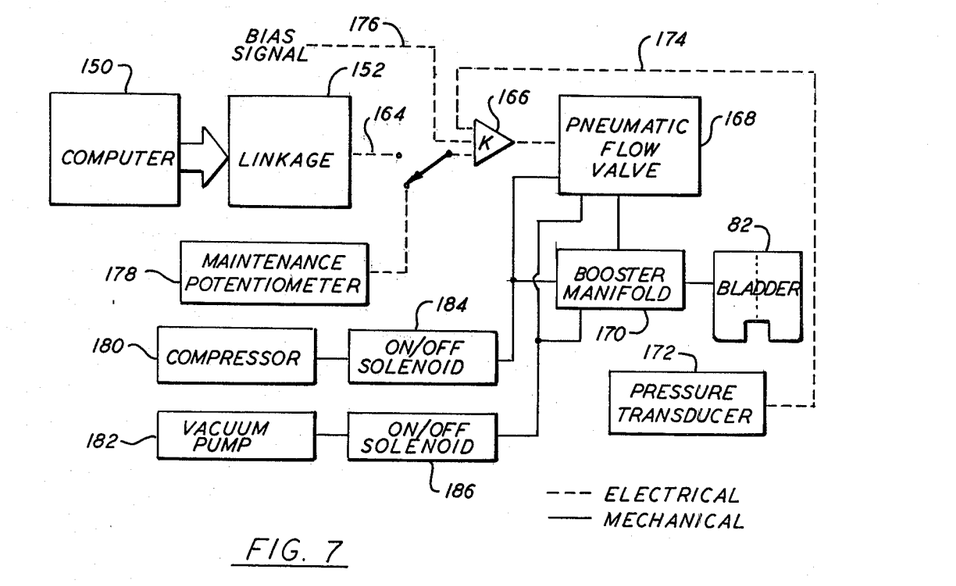
FIG. 7 is a block diagram of the control system for a firmness cell employed in the preferred embodiment of the present invention.

The firmness bladder control system, shown in FIG. 7 operates analogously to the hydraulic actuator control system. Again, computer 150 drives linkage 152 which supplies a command signal 164 to a summation amplifier 166 which, in turn, controls a pneumatic flow valve 168. Valve 168 drives booster manifold 170 which in turn controls the pressure in e.g., firmness bladder 82. A pressure transducer 172 supplies a feedback signal 174 to amplifier 166 to close the loop. A bias signal 176 establishes a reference pressure signal. A maintenance potentiometer 178 may be provided, as in the hydraulic system. A compressor 180 and vacuum pump 182 connect to the input and output ports of the valve 168 and, the booster 170 to provide high speed inflation and deflation, while on/off solenoids 184, 186 are provided to turn the pneumatic system on and off.

At a steady 1 G state, the seat is maintained at a neutral point which is formed when the seat pan plate and backrest plate are at the midpoint of their ranges, the lap belt is in the normal state of "buckled up" tension, and all firmness cells are inflated to a nominal point causing the body to be supported just adjacent to the moving plates 62 and 92. By driving the various elements on the seat under appropriate control of the computer responding to signals generated in response to the pilot's aircraft control actions, suitable haptic-somatic system stimuli may be generated to create the appropriate perception of the G forces which the aircraft being simulated would produce. As the seat plates shift in attitude and position, skeletal attitude shifts may be effected, and with them eye perspective is caused to change as well. Muscle changes tend to follow skeletal attitude shifts. By moving the backrest radial elements and varying the level of inflation of the firmness cells, flesh pressure gradient changes may be effected. Under an appropriate program the coordinaged changes in the various elements can produce simulated acceleration effects quite useful to the subject pilot.

In addition, vibration and buffet cues are generated by the seat pan assembly itself. Signals for both continuous cues such as stall buffet, background rumble and runway rumble as well as discrete cues such as touchdown bumps and discrete aero buffet are generated in computer 150 by techniques well known in the art, and are applied to the seat actuators along with other control signals in the manner described above.

PRINCIPALS OF OPERATION

Figure 8:
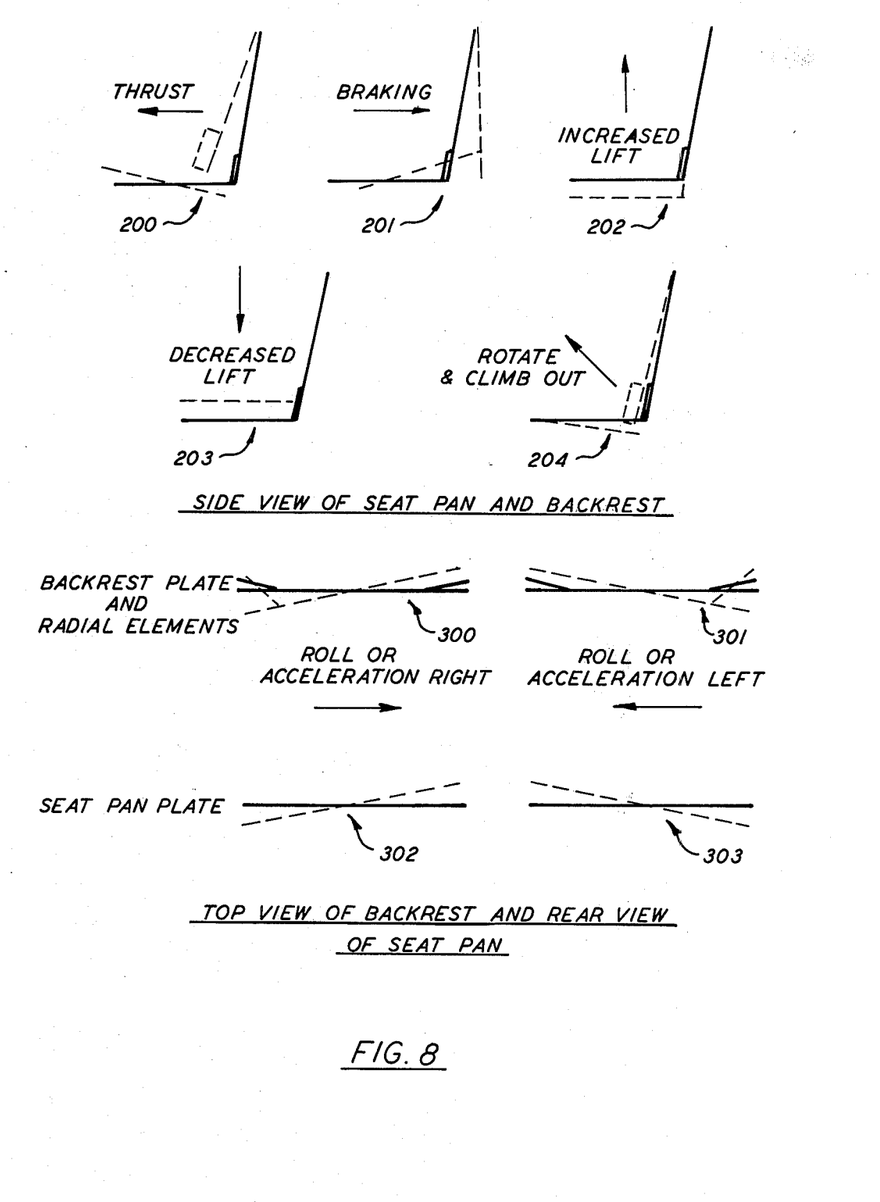
FIG. 8 is a series of schematic views depicting seat plate and backrest plate motions associated with various accelerations being simulated.

Several drive concepts are involved in the operation of the present invention. Each will be dealt with separately. FIG. 8, which illustrates several aircraft acceleration configurations, will aid in the illustration of many of these concepts. Reference numerals called out in the following text will refer to a diagram depicting the motion being described.

The G-seat drive uses a three axis reference coordinate system: the longitudinal axis of the aircraft forms the X axis, with positive in the forward direction; the vertical axis is the Z axis, with positive being down; and the lateral axis is the Y axis, with right being positive. Thus, a forward thrust will be represented by a $+\ddot{X}$ for example. It should be noted that this reference coordinate system is centered at the cockpit of a simulated aircraft; the aircraft coordinate system will be centered generally at some central point of the aircraft.

Seat Translation

The seatpan top plate translates up and down as a function of Z axis acceleration. Positive $\ddot{Z}$ acceleration (negative G's) produces increased top plate elevation 203. Negative $\ddot{Z}$ (positive G's) acceleration results in decreased top plate elevation 202. The seat pan top plate also has the capability of fore and aft movement as a function of X-axis acceleration. For positive $\ddot{X}$ acceleration (thrusting) the top plate translates forward 200 and for negative $\ddot{X}$ acceleration (braking) the top plate translates aft 201. This provides a scrubbing cue of the buttocks against the seat cushion.

The backrest plate translates as a function of X-axis acceleration. For positive $\ddot{X}$ acceleration, the backrest plate translates forward 200, while for negative $\ddot{X}$ acceleration, it translates aft 201.

Seat Orientation

The seat pan top plate and backrest plate reorient in the pitch and roll axes. The seat pan plate undergoes pitch attitudinal change for X axis accelerations. For positive $\ddot{X}$ acceleration the seat pan plate pitches up, and the backrest plate pitches bottom forward, top aft 200. The orientation reverses for negative $\ddot{X}$ acceleration 201.

Roll attitudinal changes occur for Y-axis acceleration and for aircraft roll. For positive $\ddot{Y}$ acceleration or for roll to the right the seat pan plate rolls to the left 302 and the backrest top plate also rolls to the left 300. For negative $\ddot{Y}$ acceleration, the reverse is true 301, 303.

Radial Elements

The radial elements complement the backrest top plate motions for both X and Y axis accelerations and aircraft roll. The elements provide an increased area of contact cue in the vicinity of the lower back. They are driven such that the elements traverse an arc of zero to fifty degrees in relation to the backrest top plane, through a neutral (approximately 25°) mid-point corresponding to zero acceleration.

The two elements are driven together from their neutral point in proportion to the magnitude of X-axis acceleration. For positive $\ddot{X}$ acceleration, the angle between the elements and backrest plate increases 200. For negative acceleration, the angle decreases 201.

For Y-axis and roll acceleration the elements are driven differentially. The angle of one element increases as the angle of the other decreases. The inclination is the opposite of that of the backrest plate, that is, as the backrest plate rolls left, for example, the angle of the right element decreases while that of the left increases 300, and vice versa 301.

Firmness Cells

The pressure of the seat pan and backrest firmness bladders is varied as a function of simulated aircraft acceleration. The pressure is varied uni-directionally;

the pressure is decreased from the neutral point. Inflation above the neutral point does not occur. The neutral point is that pressure which corresponds to the threshold of contact between the pilot's body and the cushion top plates. As the simulated aircraft undergoes increasing loads, the pressure in the bladders decreases, causing a flesh pressure redistribution. For vertical acceleration (positive G's) both cells of the seatpan bladder simultaneously deflate. This causes more of the seat pan top plate to come into flesh contact. This contact is particularly noticeable due to the pressence of the thigh ramps and tuberosity blocks. Longitudinal acceleration response is manifested as a decrease in the pressure of the backrest bladder. Lateral accelerations and roll cause one cell of the seatpan firmness bladder to deflate while the other cell remains at the neutral point. Rightward seat acceleration causes the left cell to deflate. The reverse is true of leftward acceleration.

Lap Belt

The lap belt drive may respond to four different sources of information. First, is the orientation of the external force acceleration projection on the XZ plane relative to the seat axis. This includes the effect of the gravity component in the Z axis direction. Both actuators are driven simultaneously from this input. For conditions of loss of lift or braking, the lap belt contracts. For conditions of increase lift or thrusting, belt extension occurs. A second source is the orientation of the gravity vector projection on the XZ relative to seat axis. This may be used to cause the lap belt to contract as the seat and aircraft pitch over to a point where the pilot is inverted, and to relax again as an upright attitude is approached. Again, both actuators are driven simultaneously.

The positions of the seat pan and backrest top plates serve as the third input to the lap belt drive. The positions are used to calculate a factor that decouples seat plate movement and lap belt movement.

The last input is a response to Y-axis acceleration and roll input. This causes a differential lap belt drive, one actuator extending while the other retracts. The sign convention is opposite to that of the seat roll orientation sign convention. That is, e.g., for rightward acceleration the right lap belt actuator contracts and left lap belt actuator extends. This creates a scrubbing effect across the pilot's midsection as the aircraft undergoes lateral acceleration or rolls right or left.

The present invention offers many advantages over the prior art g-seats. In departing from the mosaic element cushion approach potential distractions from multiple elements movements are eliminated; the present invention feels like an integrated structure. Yet, by reducing the number of driven elements, software and linkage demands are reduced. Very strong localized pressure sensations are available with the use of firmness cells, particularly when used in conjunction with the passive tuberosity blocks. The need for active thigh panels to provide area of flesh contact cues is eliminated by the use of passive ramps in conjunction with the firmness cells. The lower backrest radial elements provide very strong area of contact cues for vertical and longitudinal acceleration. Additionally, differential lap belt drive allows inclusion of lateral as well as longitudinal and vertical belt cueing. Finally, using the seat pan assembly to provide buffet cueing can eliminate the need for a separate shaker such as that disclosed in U.S. Pat. No. 4,030,208. These advantages are implemented in a seat system that faithfully reproduces the appearance of an actual aircraft seat.

Although specific embodiments of the invention have been described herein, it will be obvious to those skilled in the art that various modifications may be made without departing from the spirit of the invention. For example, pneumatic air cells, suitably constructed to provide the appropriate bandwidth may be substituted in place of the hydraulic actuators provided herein. With the foregoing in mind, it is understood that the invention is intended to be limited solely by the appended claims.

I claim:

1. A G-seat system for use in simulating vehicular motion and maneuvers, comprising:
   a. dynamic seat means comprising
      1. a singular, substantially rigid surface for supporting the buttocks of a seated subject, said surface being provided with left and right associated surface elements running longitudinally along the left and right thereof for subject outer thigh contact,
      2. first means for selectively altering the position and attitude of said surface to produce a desired body excursion of the seated subject, and
      3. first and second firmness cells located between said surface and the buttocks of said subject, one on each side of said surface, left and right, for varying perceived seat hardness and area of flesh contact of the seated subject; and
   b. second means for coordinating the operation of said first means and said left and right firmness cells to produce body excursions and variations in perceived seat hardness and area of flesh contact comparable to those in an operational vehicle.

2. The G-seat of claim 1 wherein said left and right associated surface elements are generally ramp-shaped, sloping up from the center of said surface.

3. The G-seat of claim 2 wherein said associated surface elements are in a fixed space relation with single said singular surface.

4. The G-seat of claim 1 wherein said first means provides said singular surface with three degrees of motion drive capability.

5. The G-seat of claim 4 wherein said first means is comprised of a plurality of fluid driven actuators.

6. The G-seat of claim 4 wherein said three degrees of motion are vertical, pitch, and roll.

7. The G-seat of claim 6 wherein said first means further comprises means for driving said surface in a longitudinal direction.

8. The G-seat of claim 7, wherein said longitudinal drive capability is cascaded onto said other three degrees of motion drive capability.

9. The G-seat of claim 1 wherein said firmness cells are comprised of substantially flat inflatable bladders fitting the contour shape of said singular surface.

10. The G-seat of claim 1 further comprising third means for vibrating said singular surface in a manner which provides the seated subject with the discrete and continuous vibratory cues provided by an actual aircraft in the course of a flight.

11. A G-seat system for use in simulating vehicular motion and maneuvers, comprising:
   a. dynamic seat pan means comprising
      1. a first singular, substantially rigid surface for supporting the buttocks of a seated subject, said surface being provided with left and right associated surface portions running longitudinally along the left and right thereof for subject outer thigh contact, 2. first means for selectively altering the position and attitude of said first surface to produce a desired body excursion of the seated subject, and 3. first and second firmness cells located between said first surface and the buttocks of the subject, one on each side of said surface, left and right, for varying perceived seat hardness and area of flesh contact of the seated subject;

b. dynamic backrest means comprising 1. a second singular, substantially rigid surface for supporting the back of the seated subject, 2. second means for selectively altering the position and attitude of said second surface to produce a desired body excursion of the seated subject, and 3. a third firmness cell located between said second surface and the back of the seated subject for varying perceived back supporting surface hardness; and c. third means for coordinating the operation of said first means, said left and right firmness cells, said second means and said third firmness cell to produce body excursions and variations in perceived seat hardness and area of flesh contact comparable to those in an operational vehicle.

12. The G-seat of claim 11 further comprising two additional surface elements in association with the lower portion of said second surface to provide enhanced area of contact cues to the lower back of the seated subject.

13. The G-seat of claim 12 wherein said two additional surface elements are separately movably mounted in association with the lower portion of said second surface.

14. The G-seat of claim 13 wherein said separately movable surface elements are pivotably mounted on said second surface and wherein said seat is further provided with fourth means for separately and selectively altering the position of said separately-movable surface elements to provide variable area of flesh contact cues.

15. The G-seat of claim 14 wherein said first, second and fourth means are comprised of a plurality of fluid driven actuators.

16. A G-seat system for use in simulating vehicular motion and maneuvers, comprising:

a. dynamic seat pan means comprising 1. a first singular, substantially rigid surface for supporting the buttocks of a seated subject, 2. first means for selectively altering the position and attitude of said first surface to produce a desired body excursion of the seated subject, and 3. a firmness cell located between said first surface and at least one buttock of the subject, for varying perceived seat hardness of the seated subject;

b. dynamic backrest means comprising 1. a second singular, substantially rigid surface for supporting the back of the seated subject, 2. second means for selectively altering the position and attitude of said second surface to produce a desired body excursion of the seated subject, 3. at least two separately movable surface elements in association with the lower portion of said second surface to provide enhanced area of contact cues to the lower back of the seated subject, and 4. a second firmness cell located between said second surface and surface elements and the back of the seated subject for varying perceived back supporting surface hardness; and c. third means for coordinating the operation of said first means, said first and second firmness cells, and said second means to provide body excursions and variations in perceived seat hardness and area of flesh contact comparable to those in an operational vehicle.

17. The G-seat of claim 16 wherein said separately movable surface elements are pivotably mounted on said second surface and wherein said seat is further provided with fourth means for separately and selectively altering the position of said separately-movable surface elements to provide variable area of flesh contact cues.

18. The G-seat of claim 17 wherein said second means provides said second surface with three degrees of motion drive capability.

19. The G-seat of claim 18 wherein said second means is comprised of a plurality of fluid driven actuators.

20. A method for simulating accelerations without introducing unrealistic cues, comprising the steps of:

a. seating a subject in a seat having a singular, substantially rigid buttocks supporting surface having raised portions along the thighs of the subject, and having first and second firmness cells located between said surface and a buttock of the subject, one on each side of said surface;

b. altering the position and attitude of said buttocks supporting surface to produce a desired body excursion of the subject;

c. altering the degree of inflation of at least one of said firmness cells to vary the distribution of seat pressure on the subject and to vary the area of flesh contact of the subject with the seat; and d. coordinating said alterations in position and attitude of said surface and said degree of inflation of said firmness cells in a manner which provides the seated subject with compatible somatic cues for the particular acceleration sought to be simulated.

21. The method of claim 20 further comprising the steps of:

a. providing a second singular, substantially rigid surface having a third firmness cell located between said second surface and the back of the seated subject;

b. altering the position and attitude of said second surface to produce a desired body excursion of the subject;

c. altering the degree of inflation of said third firmness cell to vary the distribution of backrest pressure on the subject; and d. coordinating said alterations in position and attitude of said second surface and said degree of inflation of said third firmness cell in a manner which provides the seated subject with compatible somatic cues for the particular accelertion sought to be simulated.

22. The method of claim 21 further comprising steps of:

a. providing at least two surface elements separately pivotably mounted on either side of the lower portion of said second surface;

b. altering the angular position of at least one of said separate pivotable elements with respect to said second surface; and coordinating said variations in the angular position of said pivotable element in a manner which provides the seated subject with compatible somatic cues for the particular acceleration sought to be simulated.

* * * * *